United States Patent [19]
Van Rooy

[11] 3,835,364
[45] Sept. 10, 1974

[54] ELECTRIC POWER CONVERTERS

[76] Inventor: Willem J. C. Van Rooy, 10 Wolmaransstreet, Potchefstroom, South Africa

[22] Filed: Mar. 5, 1973

[21] Appl. No.: 337,995

Related U.S. Application Data

[63] Continuation-in-part of Ser. No. 180,570, Sept. 15, 1971, abandoned.

[52] U.S. Cl............... 321/2, 321/45 R, 323/DIG. 1
[51] Int. Cl. ........................................ H02m, G05f
[58] Field of Search................. 321/2, 15, 18, 45 R; 331/117 R; 323/DIG. 1, 17

[56] References Cited
UNITED STATES PATENTS

| | | | |
|---|---|---|---|
| 3,323,076 | 5/1967 | Pelly | 321/45 R |
| 3,387,201 | 6/1968 | Greenberg et al. | 321/2 |
| 3,389,322 | 6/1968 | Smeltzer | 321/2 X |
| 3,406,330 | 10/1968 | Pelly | 321/45 R |
| 3,417,321 | 12/1968 | Clapp | 323/17 |
| 3,621,362 | 11/1971 | Schwarz | 321/2 |
| 3,656,046 | 4/1972 | Parke | 321/45 R |

*Primary Examiner*—William H. Beha, Jr.
*Attorney, Agent, or Firm*—Omri M. Behr; Peter J. Saylor

[57] ABSTRACT

A class of power converters which operate between two voltages of continuously variable magnitudes and continuously reversible polarities. It has bidirectional power flow capabilities and some degree of input to output isolation can be provided for. The converter includes a simple circuit arrangement of passive inductors and capacitors and solid state switches controlled in a specific logic sequence so that the output voltage tends to follow a desired reference voltage in spite of limited changes in an either active or passive load. The inherent high efficiency, the relatively high switching frequencies, the possibility of adapting to changing input output wave forms and the suitability to modular construction techniques make power supplies built in accordance with the invention substantially better suited for emergency interfacing systems of different power sources on board airborne or mobile vehicles.

6 Claims, 20 Drawing Figures

ELECTRIC POWER CONVERTERS

RELATED APPLICATIONS

This application is a continuation in part of copending application Ser. No. 180,570, filed Sept. 15, 1971 now abandoned.

BACKGROUND OF THE INVENTION

This invention relates to power converters or voltage regulators. Although the capabilities of apparatus built according to the invention are beyond those of the kind of apparatus known as DC to DC converters, this kind is included in its general capabilities.

The switching type converter has had its capabilities expanded with the advent of solid state switches especially the S.C.R. (silicon controlled rectifier). In general this device can handle more power than the transistor but has the disadvantage that once rendered conductive by a trigger pulse conduction cannot be arbitrarily stopped. Conduction terminates only and unavoidably when the current drops below a threshold value.

Designers have therefore tried to invent circuitry to overcome this problem. Usually the charging of a capacitor through a series inductor overcame this switching problem and power could be transferred from source to load in a controlled way through either pulse width modulation or pulse frequency modulation.

In the prior art there exist many ways of achieving the aims of DC to DC conversion usually of three forms. The first is known as step up conversion, the second is step down and a third form may be where there is a constant factor relating input to output voltages.

The classes relating to power converters handling slowly variable input voltages together with slowly variable output voltages where the relative magnitudes are no restriction to functioning are less numerous. If these classes then have the additional means of automatically coping with polarity reversals during operation on both input and output sides together with the means of conveying the power also back to the input from the output, exponents are to the knowledge of the inventor either non-existent or extremely rare. It was with those symmetrical requirements in view that this invention was arrived upon.

Furthermore some input output isolation can be provided, the design limitations of apparatus built according to the invention being those of the state of the art of the components.

It is envisaged that converters of this kind might interface between different power supply sources, a need for which exist aboard airborne, shipborne, space and mobile vehicles when emergency power back up is needed in case of system failures.

It is known that power supplies of the switching type have weight and size advantages. This type also has the advantage of adaptability to modular construction. The logic control circuitry can be made to control banks of switching modules, staggered in parallel each of which being protected by a fuse or other protective circuitry at little extra cost to the controlling logic hardware. A high reliability factor could be achieved with such a system because in event of the failure of single modules the rest would still share the load. Another advantage of modularity is that each different module could be timed at a different phase angle related to the power transfer cycle (a term which is described later) in analogy to a multi cylinder petrol engine. The output wave form would have a low unwanted harmonic content and less bulky lowpass filters can be used to connect the terminals to the other systems.

In the prior art in many systems it will be found that in some way or other a capacitor is charged through a series inductive network the switch being a S.C.R., this phase being followed by some similar discharging phase. The process is then repeated and for a given capacitor these two phases are distinctly discernible.

SUMMARY OF THE INVENTION

Apparatus for converting electrical energy in accordance with the present generic invention comprises at least:

a capacitive element in circuit with:
  a series-connected inductive element,
  a series-connected controlled first switching element leading to a first terminal,
  a series-connected second switching element leading to a second terminal,
  and a series-connected third switching element leading to a third terminal forming a pair with a previously mentioned terminal,
    in which at least one switching element additional to the first switching element is also controlled,
    in which the capacitive element is given a nominal positive reference side and all three mentioned switching elements are in electrical connection with the positive reference side,
  and in which at least one of the switching elements can be conductive to enable current to flow into the positive reference side and at least one of the switching elements can be conductive to enable current to flow out of the positive reference side of the capacitive element,
  and logic control circuits adapted to control switching of the switching elements consecutively and non-repetatively within each cycle of a plurality of repeated power cycles so that each switching element conducts once only in each power cycle, the logic circuits comprising at least state determining logic receiving signals of input voltage polarity, of output voltage polarity and of direction of required power flow; phase determining logic; a variable frequency oscillator controlling switching frequency so as to be proportional to the current delivered; and switcing element drivers incorporating switching element selection logic.

Thus the goals which were mentioned above in the background of this invention were attained in the following way.

At least a third phase was added and in the case of two species a fourth phase was added as well, to the two phases discernible in the operational method of the known converters.

These further phases have the object of changing the voltage across the capacitor (or the charge on it) at some stage between the two phases which were mentioned above. For clarity we can call the first phase mentioned the "charging phase" when power is delivered from the source and temporarily stored on the capacitor so that the initial switch can be switched off, and the "power delivery phase" when that energy stored on the capacitor is made available to the load.

When a third phase is added, it is a free wheeling phase and has the object of changing the polarity on the capacitor at a given stage, that is just before the charging phase or just before the power delivery phase. This polarity reversal is done by discharging the capacitor through a series connected inductive circuit so that capacitor, inductor and switch form a closed loop. The word "discharging" was used above in a loose sense, as in reality the polarity of the charge on the capacitor is reversed through this exercise irrespective of what it was. At the end of this phase a steady state is again achieved, that is, the capacitor will hold its voltage value pending an initiating switching pulse on the other switching members.

The sequence of the three phases is, however, not arbitrary but most definite. It can be written in logic algebraic form and the functional variables will be the polarities of input and output voltage, the direction of power flow and the relative amplitudes of the input to the output voltages. Apparatus comprising only the third phase added can be built to comprise a first species of the invention. In the three phase species NO input/output isolation is achieved.

However in addition to the third phase, a fourth phase can be added with greatly enhanced advantages. Firstly there are now two different charging and two different discharging phases discernible. Four phase apparatuses fall into two species, the first being the balanced input, to balanced output species where input and output share a common earth and in total there are eight unilateral switching members or four bilateral switching members connecting to the capacitor via series inductive elements.

Again the logic switching function is specific and can be written in algebraic equations where the input and output voltage polarities are variables as well as the direction of power flow; this gives a sum of eight different possibilities. In this above-mentioned balanced system there is no input to output isolation.

Input output isolation can be obtained in a third species by having a bridge arrangement of regenerative switches of 8 elements connecting the capacitor via series inductive elements to the input terminals and the same arrangement connecting the capacitor to the output terminals. A specific logic control equation with variables being input and output voltages and power flow direction, govern the switching sequences of the system. Each of the sixteen separate unilateral switches or eight bilateral switches are governed by this logic equation.

BRIEF DESCRIPTION OF DRAWINGS.

FIG. 1 is a schematic circuit diagram of a first embodiment of the first species of the invention, FIG. 2 is a graphical representation of functions of operation of the apparatus shown in FIG. 1, : FIG. 3 is a schematic circuit diagram of a second embodiment of the first species of the invention, FIG. 4 is a graphical representation of functions of operation of the apparatus shown in FIGS. 1 and 3, FIG. 5 is a schematic circuit diagram of a third embodiment of the first species of the invention, FIG. 6 is a graphical representation of functions of operation of the apparatus shown in FIG. 5, FIG. 7 is a schematic circuit diagram of a fourth embodiment of the first species of the invention, FIG. 8 is a graphical representation of functions of operation of the apparatus shown in FIG. 7, FIG. 9 is a schematic diagram of a logic control circuit applicable to the first species comprising three phase operation, FIG. 9a is a graphical summary of all the states of operation of the first species, FIGS. 10, 11, 12, 13, 16 relate to the second species, namely the balanced input/output non-isolated species, FIG. 16 shows a balanced DC to balanced DC converter with output voltage larger than input voltage, applicable in a power pack for balloon borne radio probe, including logic, FIGS. 14, 15 and 17 relate to the third species of this invention, namely the isolated four phase species (non-balanced), in which FIG. 15 shows portions of the circuitry of FIG. 14 in various phases of operation to assist a simplified explanation, in which:

DESCRIPTION OF PREFERRED EMBODIMENTS

Figure 1:
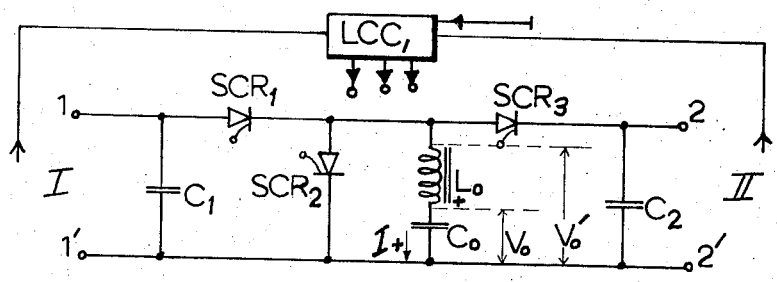
FIGS. 1, 2, 3, 4, 5, 6, 7, 8, 9, 9a relate to the first species namely the 3 phase species.

In the drawings inductors, capacitors, diodes, silicon controlled rectifiers, bidirectional silicon controlled rectifiers (or triacs), logic control circuits and resisters are designated by the reference characters L, C, D, SCR, BSCR, LCC and R respectively with various subscripts. SCRS and triacs are examples of controlled switching elements.

Logic functions are denoted by the letter f. Thus a controlling function for the triggering of the controlled rectifier A1 would be called FCRA1.

The implementation of hardware to achieve a given logic function may vary much according to state of the art. It will therefore be accepted that circuit building blocks which perform certain known functions are state of the art. These function blocks may include polarity detectors, voltage to frequency converters, logic gates etc. It is also accepted that pulse shaping and DC isolation techniques in the trigger circuitry of floating SCR's are state of the art.

Greater clarity as to the genus and species of the invention will be rendered if we define certain terms which will be used later to specify the control functions and in claims.

The term "power cycle" will denote the shortest sequence of events which has taken place to transfer power between the source and the load which is repeated continuously. Within a power cycle there is no repetition.

To discern between the different switching events we call them "phases." Within the power cycle there are different phases each which is non-repetitive. Species of three and four phases per power cycle are described.

The converter in its different embodiments when fully complemented can work between voltages which can be of either polarity and there can be step up or step down in voltage and power can flow in each case in any of the two directions between the terminal pairs. To refer to any of these possibilities of operation the term STATE is used.

In case of the three phase species, twelve different states are meaningful and are defined and numbered.

In the case of the four phase species which is balanced and NON-isolated, eight different states are meaningful and are defined and numbered.

In the case of the isolated four phase species there are also eight different states which are meaningful and are defined and numbered.

In all the illustrations of circuitry, for example in FIGS. 1, 3, 5 and 7 the symbol box "LCC," indicates logic control circuitry, in relation to which more detailed explanation will be given below, with reference to FIG. 9. It is stressed, however, that the inventive steps lie in the circuitry illustrated in detail, and the way it is controlled to function, not in the logic control circuitry per se. The logic control circuitry itself is within the state of the art and can be arrived at by those skilled in the art if given the kind of control which is required.

SPECIES 1.

A specific embodiment of the three phase species will now be described with reference to FIG. 1.

Figure 3:
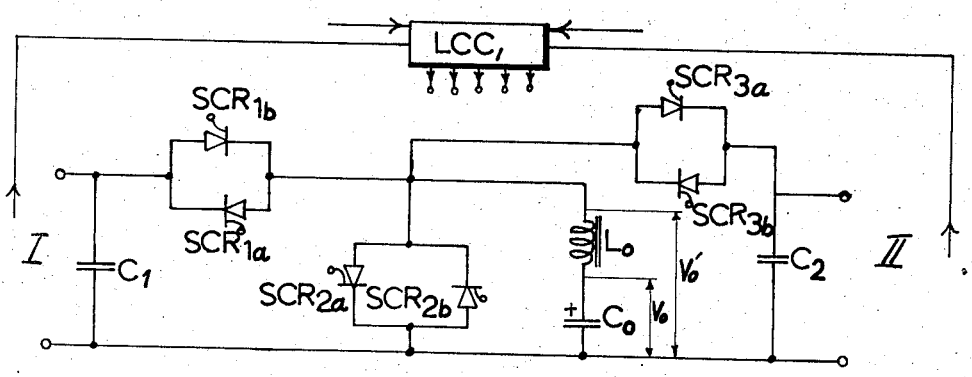

It will become clear during further discussion that this embodiment shown is a special case of the full embodiment of this species shown in FIG. 3, the only difference being that some of the SCR's are omitted in FIG. 1, and the effect being that the FIG. 1 circuit can only operate in two of the 12 states in which FIG. 3 can operate.

FIG. 1 is a circuit that can be controlled to operate in STATES 1 and 12 in TABLE 1 only. We will herein describe only the case when control logic circuitry is designed to control operation only under the voltage polarity, voltage magnitude and power flow direction restrictions of STATE 1 which are $V_2$ larger than $V_1$, both $V_1$ and $V_2$ positive and power flow from $V_1$ to $V_2$.

Figure 2:
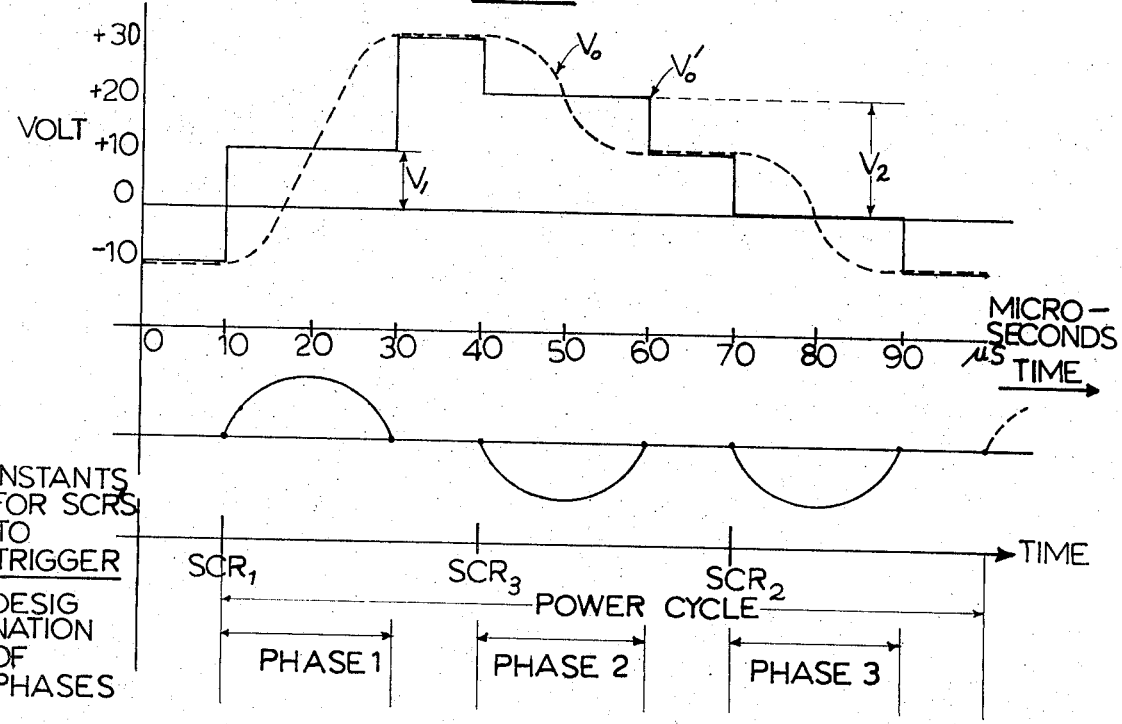

It will now be shown how this circuit operates with reference to FIG. 2.

In FIG. 2 $V_o$, the broken line will represent the voltage across the capacitor while $V_o^1$, the solid line, will represent the voltage across the inductance in series with the capacitor as indicated. (The pattern illustrated presupposes the parasitic factors such as stray capacitances, leak resistances, forward voltage drops across switch members and series resistances are ignored. In many practical cases their influence is negligible.) It is assumed that steady state conditions have been reached and that the voltage wave form measured at $V_o$ has become stable. For reasons of simplified explanation $V_1$ was chosen to be + 10 volts and $V_2$ + 20 volts. The power cycle starts with the voltage across $C_o$ being − 10 volts. The charging of $C_o$ is initiated through the series inductive circuit $L_o$, $C_o$, when SCR is pulsed and rendered conductive, the voltage across the SCR, prior to conduction being + 20 volts. The voltage oscillation results from the series resonance voltage oscillator circuit $L_o$, $C_o$.

The charging of capacitor $C_o$ will be nominally denoted by current flowing into the reference side marked + and discharging will be denoted by the opposite flow of current.

The current flowing into the capacitor $C_o$ via switch $SCR_1$ and the series inductance $L_o$ is shown. Such a charging cycle of a capacitor via an inductance and a S.C.R. is known in the state of the art. The current curve is of hemi sine wave shape while the voltage on the capacitor will change sinusoidally by double the amount which existed across the $S.C.R._1$ prior to switching, i.e., 20 volts × 2.

The voltage on $C_o$ will be (− 10 + 40) = 30 volts when, due to the current falling below the threshold value of the $S.C.R._1$, conduction will stop and $C_o$ will hold this value.

The operation described thus far will be called phase 1 and will be distinct from the other phases as in this phase energy is transferred from the source and added to that on the capacitor.

Phase 2 will now be described. This is the time interval when power or rather charge is delivered to capacitor $C_L$ by capacitor $C_o$ to be made available to the load. Phase 2 is initiated by the triggering of $S.C.R._3$ which had 10 volts across it in its conduction direction just prior to being triggered according to the above-mentioned sequence prescribed by STATE 1. After the transient discharge of $C_o$ through inductor $L_o$ in series the activated $S.C.R_3$ will again become non-conducting when th current reaches zero with the voltage on $C_o$ being (30 − 2(10) = 10) volts and will be held at that value until phase 3 is initiated.

Phase 3 of this species shows the difference between this embodiment and the prior art. During this third phase no energy is delivered to capacitor $C_o$, but the whole object of it is to change the polarity of the voltage across $C_o$. This is done by connecting $S.C.R_2$ such that when it is rendered conductive by the logic control circuitry current flows through a loop formed by the inductive component $L_o$ the capacitor $C_o$ and the switch $S.C.R_2$. In this way the + 10 volts which existed across $S.C.R_2$ just prior to being triggered is changed to − 10 volt at the end of the described power cycle, leaving $C_o$ with the suitable charge of −10 volts for the beginning of the next power cycle, and so on.

The above is the sequence necessary for controlling STATE 1 operation. The logic control circuitry will control a time lapse between each phase, dependent on the frequency of the power cycles. The frequency of the power cycles or in other words the rate of supply of pulses is modulated to control the amount of current flowing into the load. Thus current magnitude and hence power transmitted at given voltages is proportional to the power cycle frequency.

In practice the wave shapes will differ to a greater or lesser degree from those illustrated in FIG. 3 which presupposes capacitors $C_1$ and $C_2$ having a capacitance infinitely larger than $C_0$.

Figure 4:
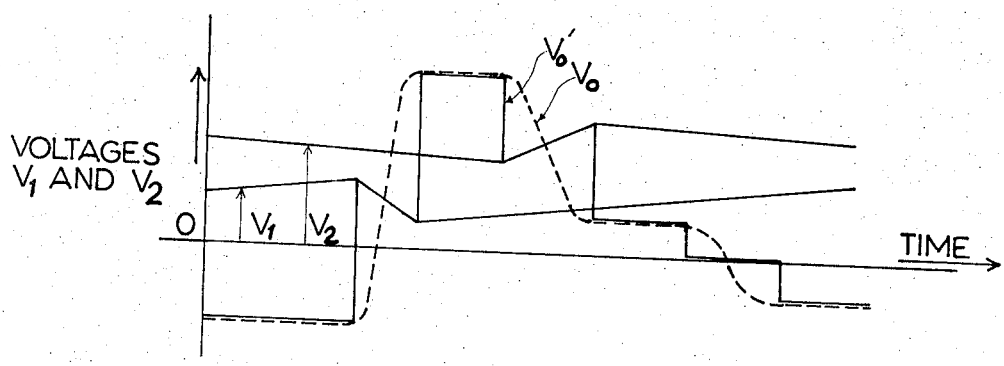

The effect of $C_1$ and $C_2$ having a finite capacitance is apparent from FIG. 4.

Moreover, the wave shapes illustrated will not be assumed instantaneously when switching on from the quiescent state. A transient stage will be passed through. After a period these effects will be damped out, when a stabilised condition will take over. The energy balance will be preserved, however, at all times.

It is possible to economize on S.C.R's when single state operation only is required. In that case it is possible to replace one S.C.R. only in a specific place dependent on the particular STATE required with a diode. The requirements of that STATE should also be met at all times and to ensure that additional circuitry may be required.

Figure 5:
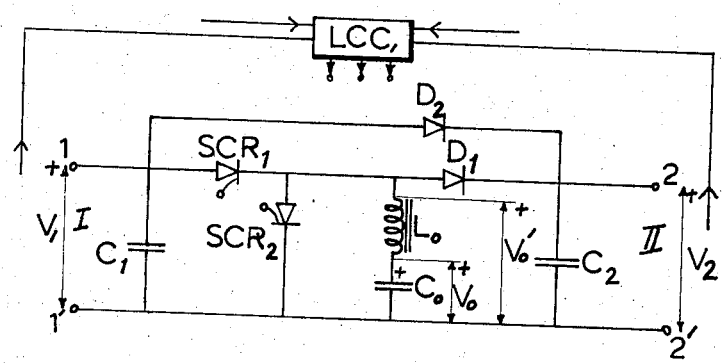

FIG. 5 shows such an example.

An embodiment for STATE 1 operation only is shown, where S.C.R$_3$ in FIG. 1 has been replaced by diode $D_1$. A further diode $D_2$ ensures that the output $V_2$ is at least that of $V_1$ so that STATE 1 is met with passive loads.

Figure 6:
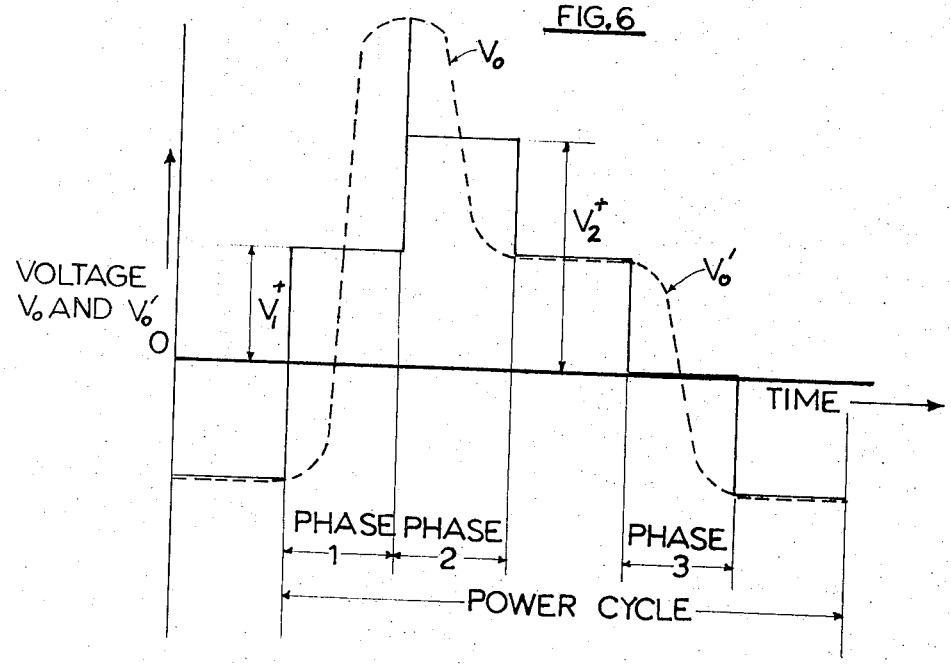

The logic control circuitry is very much simplified as it means control is facilitated by the alternate triggering of S.C.R$_1$ and S.C.R$_2$ according to a variable rate which the output requirements dictate. The resulting voltage wave form of $V_o$ is also shown in FIG. 6 where the difference from FIG. 2 is now illustrated.

Diode $D_1$ will conduct during phase 2 when required and no external triggering is required as a blocking function is not needed in STATE-1-only equipment.

Figure 7:
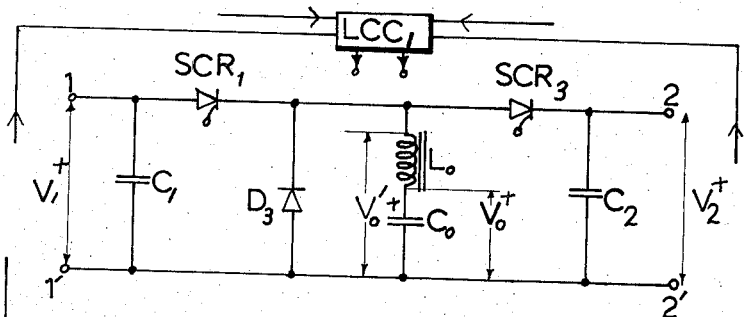
Figure 8:
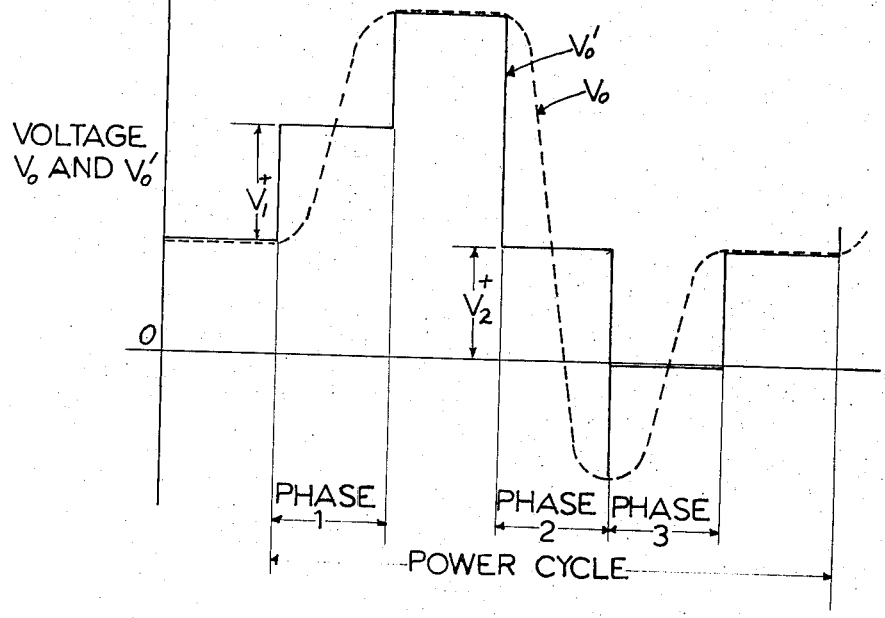

A further embodiment is shown in FIG. 7 relating to another single STATE special case of the three phase species. This time the operational conditions are positive source to positive load with output of lower voltage than input, STATE 2 according to table 1. The S.C.R.'s again simply alternate with $D_3$ polarity reversed compared to polarity of S.C.R$_2$ in FIG. 5. The fact that S.C.R$_2$ can be replaced with a diode $D_3$ can be seen from the resulting wave form on $V_o$ shown in FIG. 8. Phase 3 is now automatically following phase 2 because of the diode $D_3$'s action.

We now come to the stage in this description where the full three phase embodiment with its 12 states can be tabulated. The embodiment is shown in FIG. 3 and the symmetry regarding the two terminal pairs I and II would be obvious. It is called the full embodiment in reference to the fact that the full complement of 12 states are possible.

The following table represents the different control conditions for triggering the S.C.R.'s.

TABLE 1.

TABLE 1 containing the truth table to logically control the three phase species through all 12 applicable STATES.

TABLE I—Continued (a) Energy transferred from $V_1$ to $V_2$

| No. of STATE | Polarity of $V_1$ | Polarity of $V_2$ | Relative Magnitude |
|---|---|---|---|
| 1 | + | + | $|V_1|<|V_2|$ |
| 2 | + | + | $|V_1|>|V_2|$ |
| 3 | + | − | not applicable |
| 4 | − | + | not applicable |
| 5 | − | − | $|V_1|<|V_2|$ |
| 6 | − | − | $|V_1|>|V_2|$ |

| | Order of SCR triggering | | when operating continuously in a single STATE a diode can replace this SCR. |
|---|---|---|---|
| | 1st | 2nd | 3rd | |
| 1 | SCR$_{1b}$ | SCR$_{3a}$ | SCR$_{2a}$ | SCR$_{3a}$ |
| 2 | SCR$_{1b}$ | SCR$_{3a}$ | SCR$_{2b}$ | SCR$_{2b}$ |
| 3 | SCR$_{1b}$ | SCR$_{2a}$ | SCR$_{3b}$ | SCR$_{3b}$ |
| 4 | SCR$_{1a}$ | SCR$_{2b}$ | SCR$_{3a}$ | SCR$_{3a}$ |
| 5 | SCR$_{1a}$ | SCR$_{3b}$ | SCR$_{2b}$ | SCR$_{3b}$ |
| 6 | SCR$_{1a}$ | SCR$_{3b}$ | SCR$_{2a}$ | SCR$_{2a}$ |

(b) Energy transferred from $V_2$ to $V_1$

| No. of STATE | Polarity of $V_2$ | Polarity of $V_1$ | Relative Magnitudes |
|---|---|---|---|
| 7 | + | + | $|V_2|<|V_1|$ |
| 8 | + | + | $|V_2|>|V_1|$ |
| 9 | + | − | not applicable |
| 10 | − | + | not applicable |
| 11 | − | − | $|V_2|<|V_1|$ |
| 12 | − | − | $|V_2|>|V_1|$ |

| | Order of SCR triggering | | SCR with diode replaceable for single STATE. |
|---|---|---|---|
| | 1st | 2nd | 3rd | |
| 7 | SCR$_{3b}$ | SCR$_{1a}$ | SCR$_{2a}$ | SCR$_{1a}$ |
| 8 | SCR$_{3b}$ | SCR$_{1a}$ | SCR$_{2b}$ | SCR$_{2b}$ |
| 9 | SCR$_{3b}$ | SCR$_{2a}$ | SCR$_{1b}$ | SCR$_{1b}$ |
| 10 | SCR$_{3a}$ | SCR$_{2b}$ | SCR$_{1a}$ | SCR$_{1a}$ |
| 11 | SCR$_{3a}$ | SCR$_{1b}$ | SCR$_{2b}$ | SCR$_{1b}$ |
| 12 | SCR$_{3a}$ | SCR$_{1b}$ | SCR$_{2a}$ | SCR$_{2a}$ |

Table I above can be generalized in concept by replacing each SCR with a bidirectional switching device designated BDR, an SCR being an example of a BDR. Subscripts $a$ and $b$ can be substituted for by subscripts + and − respectively.

GENERALIZED TABLE I (a) Energy transferred from the first terminal pair to the second terminal pair.

| No. of STATE | Polarity of $V_1$ | Polarity of $V_2$ | Relative Magnitude of $V_1$ and $V_2$ |
|---|---|---|---|
| 1 | + | + | $|V_1|<|V_2|$ |
| 2 | + | + | $|V_1|>|V_2|$ |
| 3 | + | − | not applicable |
| 4 | − | + | not applicable |
| 5 | − | − | $|V_1|<|V_2|$ |
| 6 | − | − | $|V_1|>|V_2|$ |

Order of triggering bidirectional switching elements

| | 1st | 2nd | 3rd |
|---|---|---|---|
| 1 | BDR$_{1-}$ | BDR$_{3+}$ | BDR$_{2+}$ |
| 2 | BDR$_{1-}$ | BDR$_{3+}$ | BDR$_{2-}$ |
| 3 | BDR$_{1-}$ | BDR$_{2+}$ | BDR$_{3-}$ |
| 4 | BDR$_{1+}$ | BDR$_{2-}$ | BDR$_{3+}$ |
| 5 | BDR$_{1+}$ | BDR$_{3-}$ | BDR$_{2-}$ |
| 6 | BDR$_{1+}$ | BDR$_{3-}$ | BDR$_{2+}$ |

GENERALIZED TABLE I — Continued (b) Energy transferred from second terminal pair to first.

| No. of STATE | Polarity of $V_2$ | Polarity of $V_1$ | Relative Magnitudes of $V_1$ and $V_2$ |
|---|---|---|---|
| 7 | + | + | $|V_2| < |V_1|$ |
| 8 | + | + | $|V_2| > |V_1|$ |
| 9 | + | − | not applicable |
| 10 | − | + | not applicable |
| 11 | − | − | $|V_2| < |V_1|$ |
| 12 | − | − | $|V_2| > |V_1|$ |

Order of triggering bidirectional switching elements

| | 1st | 2nd | 3rd |
|---|---|---|---|
| 7 | $BDR_{3-}$ | $BDR_{1+}$ | $BDR_{2+}$ |
| 8 | $BDR_{3-}$ | $BDR_{1+}$ | $BDR_{2-}$ |
| 9 | $BDR_{3-}$ | $BDR_{2+}$ | $BDR_{1-}$ |
| 10 | $BDR_{3+}$ | $BDR_{2-}$ | $BDR_{1+}$ |
| 11 | $BDR_{3+}$ | $BDR_{1-}$ | $BDR_{2-}$ |
| 12 | $BDR_{3+}$ | $BDR_{1-}$ | $BDR_{2+}$ |

Figure 9A:
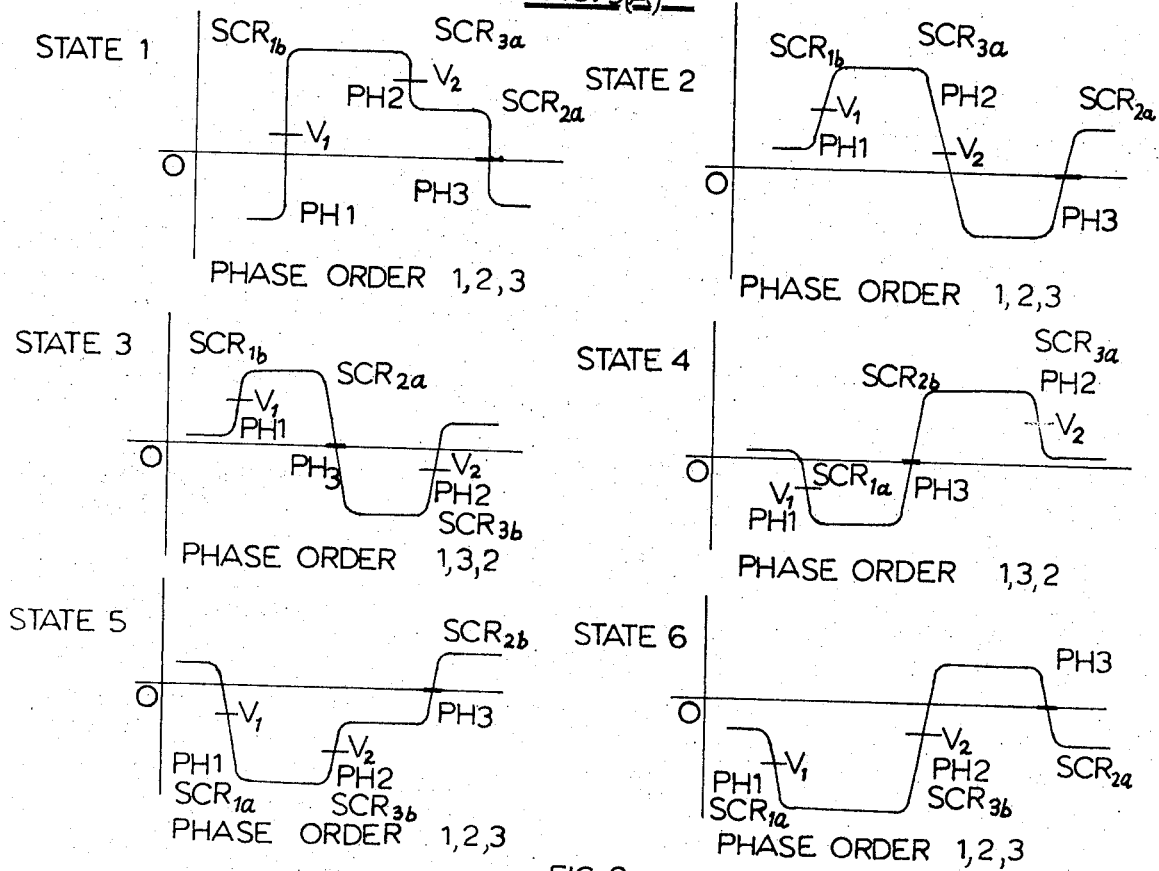
Figure 9:
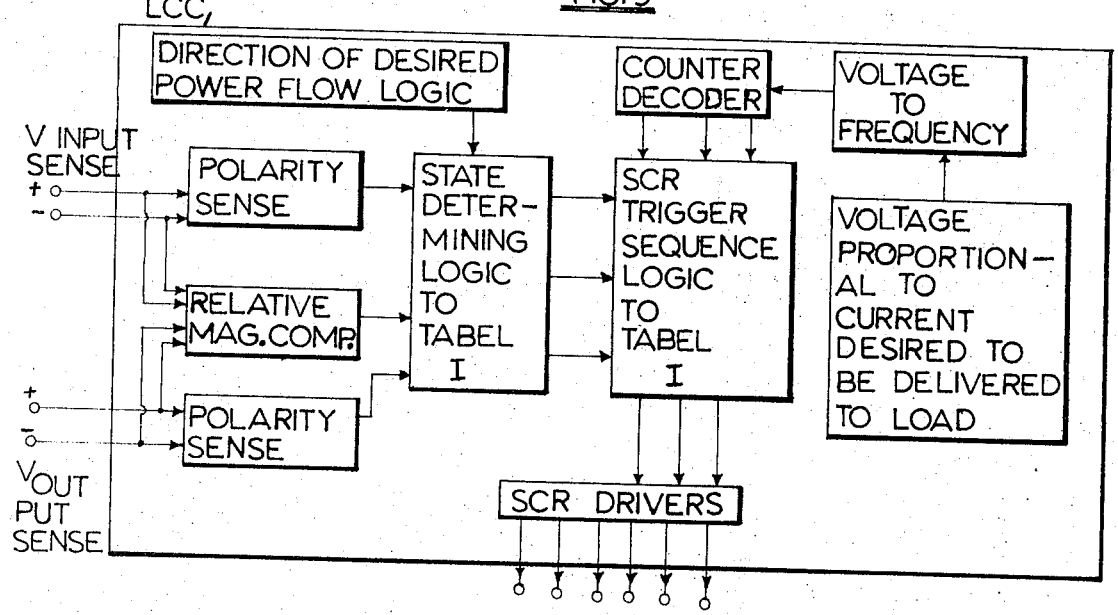

FIG. 9 illustrates a proposed logic circuitry to implement the logic control functions for the full complement of STATES of the three phase species. This basic concept is controlled by two signals (apart from the sensing of $V_1$ and $V_2$) which are a logic control which states the direction of the desired power flow that is from $V_1$ to $V_2$ or vice versa, and an analogue input voltage which governs the rate at which the switching will occur. This allows for more scope in the implementing of the invention. Should it however be desired that the output voltage follow a desired variable reference voltage further circuitry will be needed, these being a comparison amplifier to compare the reference and output voltages, an absolute value network so that the power cycle rate may be governed by the voltage difference and extra logic to decide in which direction power should flow. The idea is that should the output be of higher voltage than desired power shall be withdrawn actively and delivered to the primary source. In this way active loads within limits will be driven to the desired voltage.

Wave forms relating to the 12 different states of the three phase species are shown in FIG. 9a. The three different phases are numbered phase order 1, 2, 3 per power cycle. States 1 to 6 are shown in FIG. 9a. Wave forms for states seven to 12 are identical to the wave forms shown for states one to 6 respectively apart from the fact that designations $V_1$ and $V_2$ are interchanged.

Species 2

Figure 10:
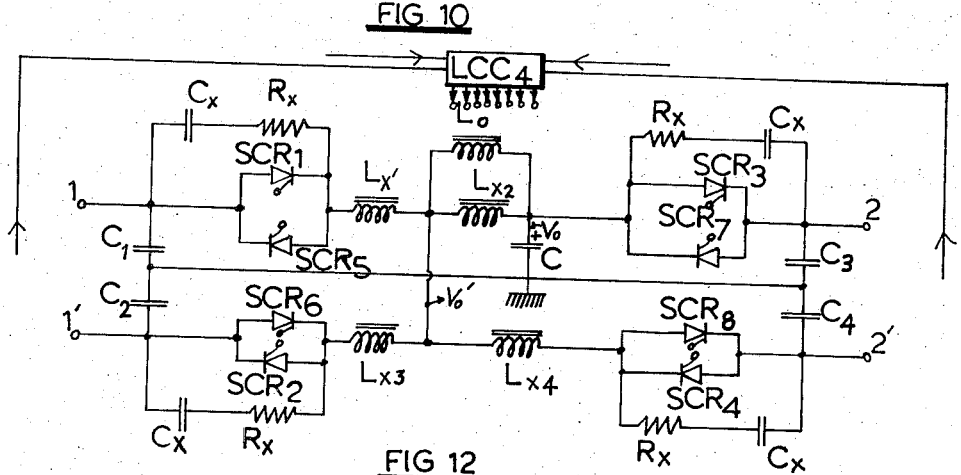
FIG. 10 is a schematic circuit diagram of a first embodiment of the second species of the invention.

In FIG. 10 there is shown a circuit embodiment of the four phase species where a balanced input voltage and a balanced output voltage with no isolation is called for.

In this circuit there are eight possible STATES. Again as in the case of the three phase system apparatus could be made to work in less than eight states with the consequence that those switching members not needed for those states can be omitted together with the simplification of the controlling logic circuitry. If a further restriction is placed on operation, i.e., that the output voltage be larger than the input voltage, the SCR's associated with phases 1 and 3 (see table II) can be replaced by diodes, in all eight STATES.

The four phase balanced non-isolated species will be explained at first with reference to FIG. 11 which shows the most simple embodiment, which can work at one state only. This is in the form of a balanced DC to DC balanced converter with output voltage larger than input voltage, unidirectional power flow only and there is no input-output isolation. This enables substituting $SCR_3$ with diode $D_1$ and $SCR_4$ with diode $D_2$ in this embodiment $SCR_5$, $SCR_6$, $SCR_7$ and $SCR_8$ are omitted. To again ensure that the step up requirement is met that the onput is at least of the same magnitude as the input, diodes $D_3$ and $D_4$ are added. As the diodes are not restricted to the same $dv/dt$ requirements as are SCR's L × 2 and L × 4 which are inserted for those purposes may be omitted.

Figure 11:
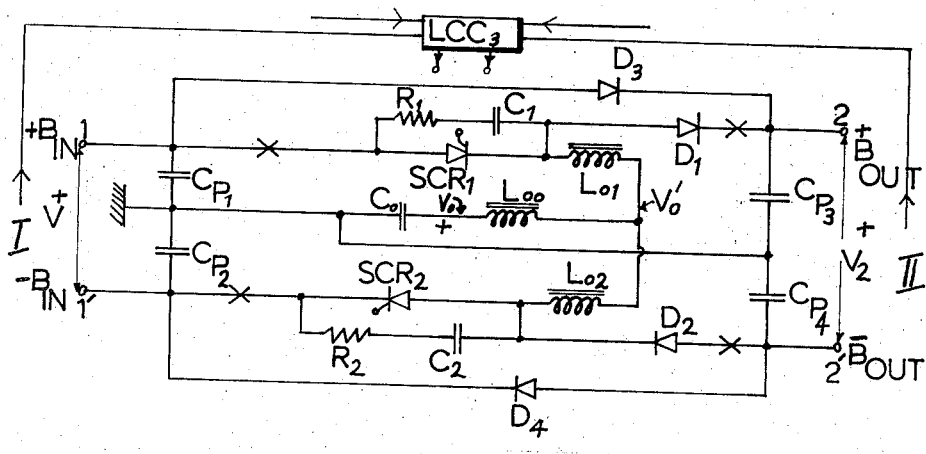
FIG. 11 is a schematic circuit diagram of a second embodiment of the second species of the invention.

The embodiment of this special case converter is shown in FIG. 11.

Figure 12:
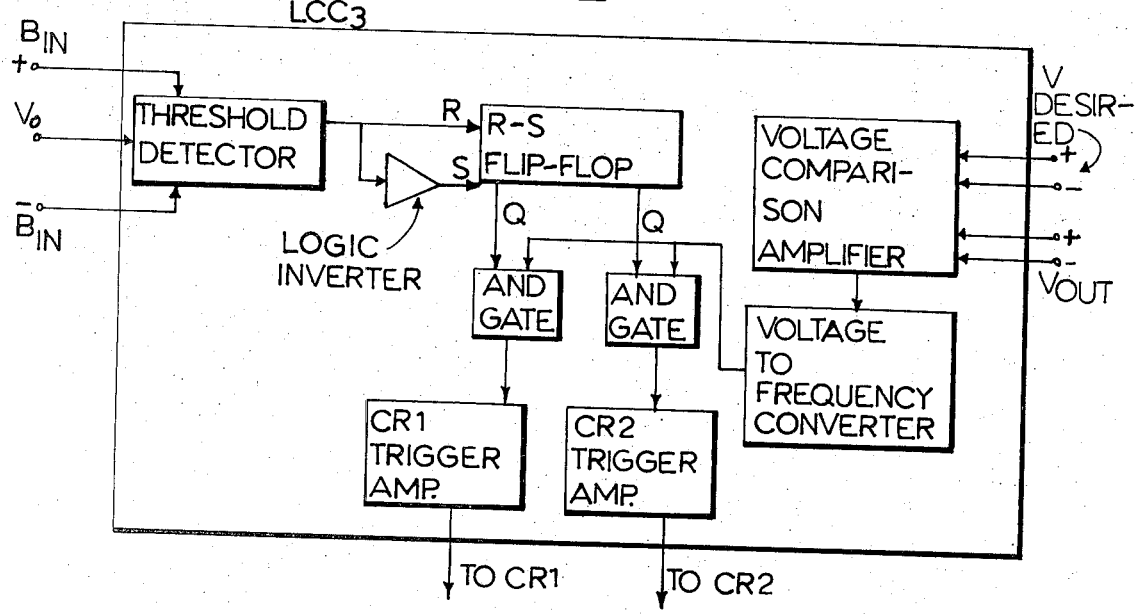
FIG. 12 is a schematic diagram of logic circuits applicable to control of the apparatus shown in FIG. 11.

A block diagram for the control of the circuit in FIG. 11 is shown in FIG. 12.

Only two controlled rectifiers $SCR_1$ and $SCR_2$ are needed for switching the phases 2 and 4 respectively. See table II. (The enumeration of the phases will later be fully explained in the four phase species). Diodes $D_1$ and $D_2$ will switch automatically by way of the voltage polarity across them, during phase three and phase one respectively.

A salient feature in this embodiment is that the inductor $L_o$ is split between $L_{o1}$, $L_{oo}$ and $L_{o2}$, and that diode $D_1$ shares all the inductance with $SCR_1$ and the same is the case with diode $D_2$ and $SCR_2$. This ensures that both $D_1$ and $D_2$ are switched at the proper time. The splitting of the inductance into parts is merely a practical design feature for the economization of the overall design. The requirement for operation is that the charging and discharging of capacitor $C_o$ must be done with some inductance somewhere in series with the switching member. The resistive capacitive networks $R_1$, $C_1$ and $R_2$, $C_2$ are the usual precaution against the spontaneous triggering of the SCR due to a too high $dv/dt$ value attained.

The capacitors $C_{p1}$, $C_{p2}$, $C_{p3}$ and $C_{p4}$ which connect the respective terminals to ground are for the smoothing of the input and output voltages and must be capable of supplying the high ripple current without having large ripple voltages across them, thus $C_{p1}$, $C_{p2}$, $C_{p3}$ and $C_{p4} >> C_o$.

The X marks denote proposed busbars in case of staggered modules. This will mean that if the different modules are timed at equal phase angles during the power cycle, capacitors $C_{p1}$, $C_{p2}$, $C_{p3}$ and $C_{p4}$ can be economized because the unwanted harmonic content will be lower.

FIG. 12 shows the control logic arrangement for the embodiment of FIG. 11.

The logic control circuitry consists of a threshold detector which senses the zero voltage crossover of $V_o$ on the hot side of the capacitor $C_o$. This senses the state of the power cycle and selects the proper phases to follow. This is simple because phase 3 follows phase 2 automatically and phase 1 follows phase 4 automatically due to the diode switching of $D_1$ and $D_2$. This means that only phase 2 and phase 4 need be initiated by supplying trigger pulses to $SCR_1$ and $SCR_2$ respectively. The state of the threshold detector is applied via a logic state inverter to a set-reset flip flop which in turn governs the state of two logic and - gates each of which leads to pulse shaping amplification and isolation networks, to properly trigger $SCR_1$ and $SCR_2$. Thus when working properly, the voltage on $V_o$ being positive should allow $CR_2$ to receive the next pulse from the voltage to frequency converter and so start phases 4 and 1. The time interval between this pulse and the one which $SCR_1$ received previously should have a minimum value to allow phase 2 and phase 3 to be completed and this time is about the period $\Delta T_o$ of natural resonance of the series inductive capacitive network $L_o$ (the total of $L_{o1} + L_{oo}$) and $C_o$ $\Delta$ $T_o = 1/F_o = Z\widetilde{1}1/W_o = 2\widetilde{1}1 \sqrt{L_oC_o}$ seconds.

The min duration of a power cycle is then $\tau 2\beta T_o$

If on the other hand $V_o$ is negative $SCR_1$ should receive the next pulse and the and-gate controlling the pulse flow from the voltage to frequency converter should be opened, to initiate phases 2 and 3.

The rate of pulses which come from the voltage to frequency converter govern the amount of current transferred to the output. The demand is computed by the voltages comparison amplifier operating between the true output voltage and the desired output voltage to feed the voltage to frequency converter.

The larger the voltage difference between the desired output and the true output is, the higher the rate of pulses will be which come from the voltage to frequency converter and so the power cycle frequency will rise. More current will be delivered to the load so that this whole process tends to stabilise the output voltage regardless of load variations.

The mean amount of current I out supplied to output is; $I_{out} = (\Delta q/)/\Delta T_p$ (coulomb)/(sec) where $\Delta q/$ $C_o \Delta V$ and $\Delta V \approx 2 V_1$ input.

The mean amount of power will be $$P = V_{out} I_{out} = 2C_o V_{out} V_{in} /\Delta T_p \text{ (volt } x \text{ amps)}$$

For a given power cycle period $\Delta T_p$ being constant the current delivered to the load will be proportional to the input voltage.

If the input voltage varies for constant load, the power cycle frequency will therefore vary accordingly.

The whole power cycle with its four phases and the associated wave forms of the control circuitry will at best be explained by diagrams. These diagrams do not show switching transients when the whole system having been at rest for a while is switched on for operation but assume that a steady state has been reached.

Figure 13:
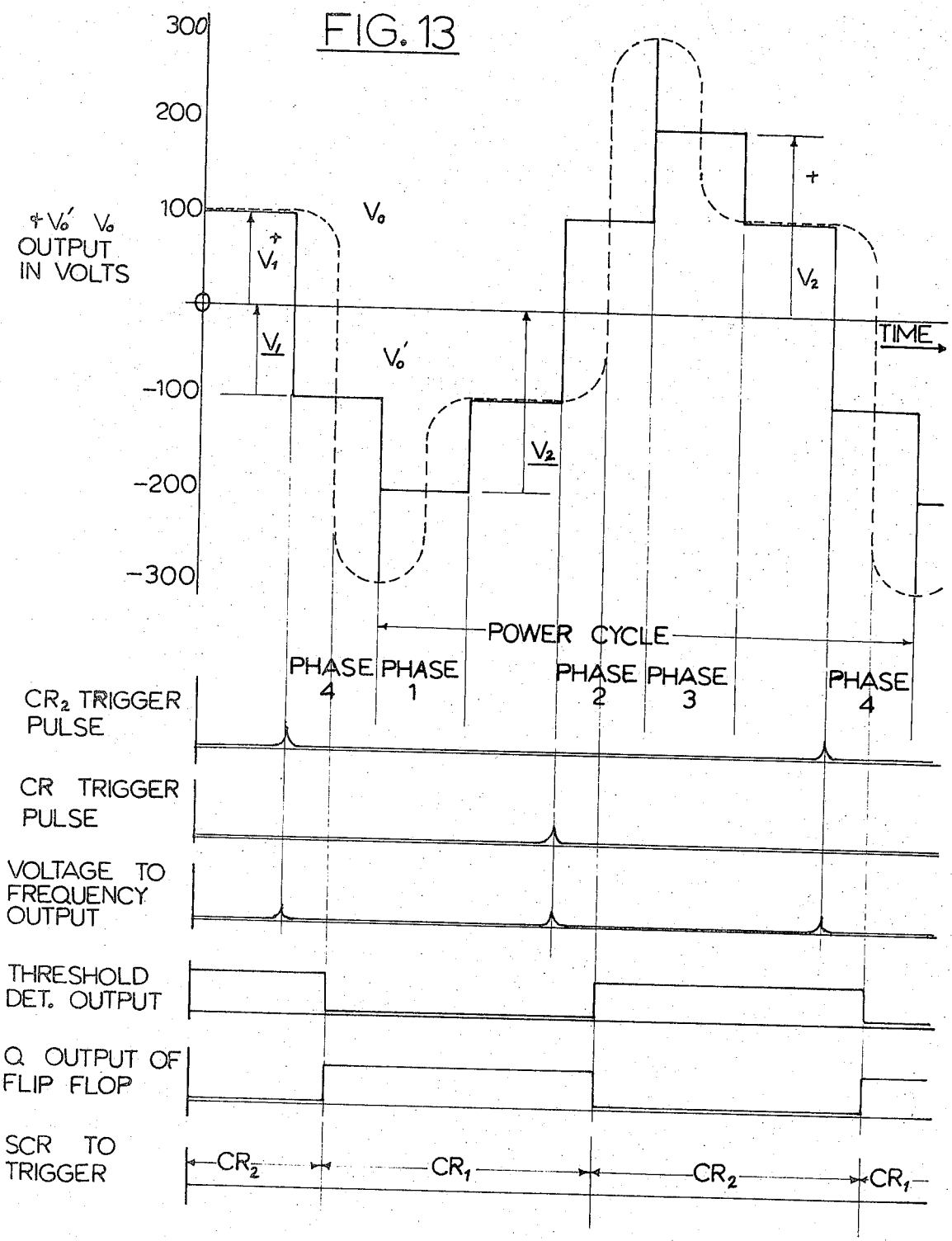
FIG. 13 is a graphical representation of functions of operation in an example of the apparatus shown in FIG. 11.

Referring to FIG. 13, let us take merely for example a balanced voltage source of ± 100 volt, being stepped up to a balanced output of ± 200 volts at load. Measured referring to earth potential the wave forms measured at $V_o$ and $V_o'$ are most instructive.

FIG. 16 shows an embodiment as has just been described, that is a balanced DC to balanced DC converter with output voltage larger than input voltage. Salient points are the split inductor $L_{o1}$ and $L_{o2}$, compensating network $R^k - C^k$ for the switching characteristics of SCR T, balanced input $I_a$, $I_b$ floating earth E, and simple logic circuitry F gating the trigger pulses from the unijunction voltage to frequency converter G, dependent on the voltage of capacitor $C_o$ by the threshold detector flip flop arrangement H. The voltage regulator M is a Fairchild (TRADE MARK) $\mu$ A 723 integrated circuit and compares a reference voltage with the output to control the voltage to frequency converter. Supply voltage stabilizer N is a National Semiconductor (TRADE MARK) LM 109 K.

We will now return to the full four phase embodiment shown in FIG. 10 which can be controlled through all eight states according to table II.

TABLE II.

Logic control circuit truth-table for the control of four phase balance — non-isolated Species
II(A)

| Polarity of $V_1$ | logic function $f_{V_1}$ | Polarity of $V_2$ | logic function $f_{V_2}$ | direction of desired power flow | logic function $f_P$ | designated STATE NO. |
|---|---|---|---|---|---|---|
| + | 1 | + | 1 | $V_1 \rightarrow V_2$ | 1 | 1 |
| + | 1 | + | 1 | $V_1 \leftarrow V_2$ | 0 | 2 |
| + | 1 | − | 0 | $V_1 \rightarrow V_2$ | 1 | 3 |
| + | 1 | − | 0 | $V_1 \leftarrow V_2$ | 0 | 4 |
| − | 0 | − | 0 | $V_1 \rightarrow V_2$ | 1 | 5 |
| − | 0 | − | 0 | $V_1 \leftarrow V_2$ | 0 | 6 |
| − | 0 | + | 1 | $V_1 \rightarrow V_2$ | 1 | 7 |
| − | 0 | + | 1 | $V_1 \leftarrow V_2$ | 0 | 8 |

L— STATE TRUTH TABLE

TABLE II(B)

| STATE desig. | phase No. 1 | 2 | 3 | 4 |
|---|---|---|---|---|
| 1 | $SCR_4$ | $SCR_1$ | $SCR_3$ | $SCR_2$ |
| 2 | $SCR_6$ | $SCR_7$ | $SCR_5$ | $SCR_8$ |
| 3 | $SCR_7$ | $SCR_1$ | $SCR_8$ | $SCR_2$ |
| 4 | $SCR_6$ | $SCR_4$ | $SCR_5$ | $SCR_3$ |
| 5 | $SCR_7$ | $SCR_8$ | $SCR_8$ | $SCR_5$ |
| 6 | $SCR_1$ | $SCR_4$ | $SCR_2$ | $SCR_3$ |
| 7 | $SCR_4$ | $SCR_6$ | $SCR_3$ | $SCR_5$ |
| 8 | $SCR_1$ | $SCR_7$ | $SCR_2$ | $SCR_8$ |

Table II and Table II(B) can be generalized in concept by replacing each SCR with a bidirectional switching element, designated BDR, of which an SCR is an example. The nomenclature with regard to subscripts can also be changed with advantage as follows: The first, second, third and fourth bidirectional switching elements are designated by $BDR_1$, $BDR_2$, $BDR_3$ and $BDR_4$ respectively, with the additional subscript "+" indicating a conducting state in the case of $BDR_1$ from the first terminal of the first terminal pair to the capacitor, in the case of $BDR_2$ from the second terminal of the first terminal pair to the capacitor, in the case of $BDR_3$ from the first terminal of the second terminal pair of the capacitor and in the case of $BDR_4$ from the second terminal of the second terminal pair to the capacitor and the subscript "−", indicating the opposite direction conducting state in each case:

previously described, the main object being to reverse the polarity of the charge stored on the capacitor somewhere in between phases 1 and 2, the exact position dependent on the STATE in which the system is operating in. Apparatus operating in such a three phase manner can be considered to belong to one particular species of the three species of the present generic invention.

GENERALIZED TABLE II

| Designated State | Polarity of $V_1$ | Polarity of $V_2$ | Direction of desired Power Flow | Phase Number | | | |
|---|---|---|---|---|---|---|---|
| | | | | 1 | 2 | 3 | y |
| 1 | + | + | $V_1 \rightarrow V_2$ | $BDR_{4+}$ | $BDR_{1+}$ | $BDR_{3-}$ | $BDR_{2-}$ |
| 2 | + | + | $V_1 \leftarrow V_2$ | $BDR_{2+}$ | $BDR_{3+}$ | $BDR_{1-}$ | $BDR_{4-}$ |
| 3 | + | − | $V_1 \rightarrow V_2$ | $BDR_{3+}$ | $BDR_{1+}$ | $BDR_{4-}$ | $BDR_{2-}$ |
| 4 | + | − | $V_1 \leftarrow V_2$ | $BDR_{2+}$ | $BDR_{4+}$ | $BDR_{1-}$ | $BDR_{3-}$ |
| 5 | − | − | $V_1 \rightarrow V_2$ | $BDR_{3+}$ | $BDR_{2+}$ | $BDR_{4-}$ | $BDR_{1-}$ |
| 6 | − | − | $V_1 \leftarrow V_2$ | $BDR_{1+}$ | $BDR_{4+}$ | $BDR_{2-}$ | $BDR_{3-}$ |
| 7 | − | + | $V_1 \rightarrow V_2$ | $BDR_{4+}$ | $BDR_{2+}$ | $BDR_{3-}$ | $BDR_{1-}$ |
| 8 | − | + | $V_1 \leftarrow V_2$ | $BDR_{1+}$ | $BDR_{3+}$ | $BDR_{2-}$ | $BDR_{4-}$ |

Furthermore when triacs or bidirectional SCR's are used to combine some of the pairs for instance $SCR_1$ and $SCR_5$ into $SCR_A$ a triggering pulse supplied to it will be $f_{SCR_1} + f_{SCR_5} = C_{SCRA}$ in Boolean sense.

The switching sequence for the full four phase embodiment is given in the truth-table with the proper STATES.

The phases are sequential which means that phase 1 follows phase 4 and phase 2 follows phase 1 etc. The designations of the SCR's to be triggered are shown.

If it is furthermore restricted that the output is larger than input for single STATE operation the SCR's coinciding with phases 1 and 3 may be replaced by diodes.

Species 3.

Figure 14:
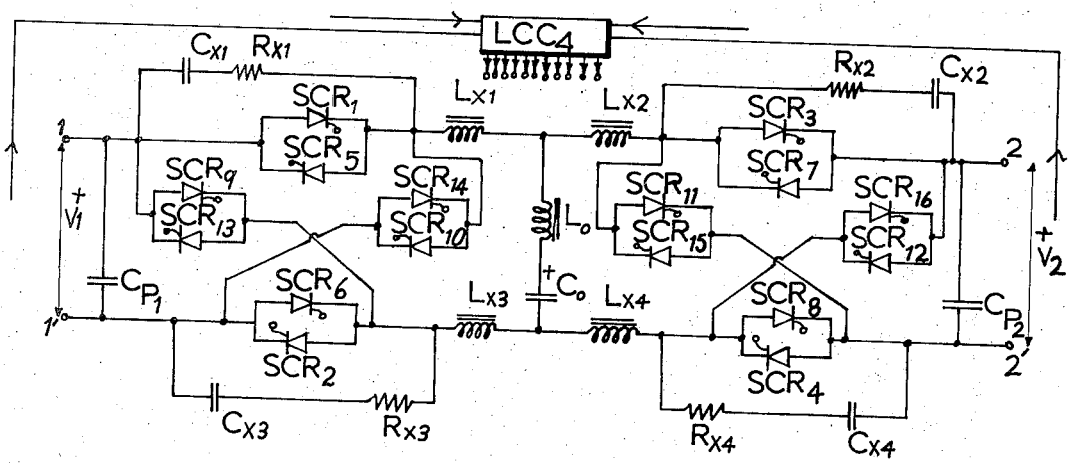
FIG. 14 shows a full embodiment of the third species.

Referring to FIG. 14 we are now describing a four phase isolated species of power converters. The main object is to isolate the input from the output to a certain extent. This is done at the cost of further SCR's but this disadvantage is again offset by the fact that for a given power rating $C_o$ can now be halved in size. Balanced voltages are no longer needed. $C_o$ costs proportionately much more than the extra SCR's.

To facilitate this, the SCR's are arranged in two bidirectional bridge arrangements to end up with a configuration which can handle all states. However it is again possible to omit some of the SCR's when the circuit is worked at less than the full complement of states. Table III shows the triggering order of the controlled rectifiers and the sequence necessary for each state.

Together with an explanation of how this embodiment works, a more comprehensive discussion of the different phases will be made. This will be done so that the difference between state of the art equipment and that built according to this description may be clearly understood. Briefly the cyclic charging of a capacitor through a series inductive network and a regenerative switch such as a SCR, and the discharging of that same capacitor through another network can be considered a broad description of what is done widely in the prior art. These are defined for the purpose of clarity as two phase systems. There are a single distinct charging phase and a single discharging phase which alternately come into operation during the power cycle. It could be regarded as if the inventor has added to these two phases at least a third "free-wheeling" phase as has been previously described, the main object being to reverse the polarity of the charge stored on the capacitor somewhere in between phases 1 and 2, the exact position dependent on the STATE in which the system is operating in. Apparatus operating in such a three phase manner can be considered to belong to one particular species of the three species of the present generic invention.

A second species was described when a fourth phase was incorporated in a balanced non isolated circuitry.

Each phase in a given state of operation can be associated with a single switching member and there is either a charging action or a discharging action of the capacitor. The phases are defined to operate so that phase 1 and phase 2 are distinctly different charging phases. By "charging" is meant the flowing of current into one reference terminal of the capacitor nominally marked positive. Phases 3 and 4 are defined as distincly different discharging phases. Unlike in the previous three phase system where the phase denoted by No. 3 comes somewhere between 1 and 2 and the sequence may thus be reversible, (i.e. 1-2-3-1--2-3-etc or 1-3-2-1-3-2-etc) we define the four phase system so that the phases are the same numerically and sequentially in time, i.e., phase 2 follows phase 1 etc. The two charging phases (phases 1 and 2) then charge the capacitor by the same voltage increase as the voltage decrease by which it will be discharged during phases 3 and 4 when steady state conditions are reached.

Returning to FIG. 14 we continue discussing the four phase isolated species. It can be pointed out that now a given phase can no longer be associated with a terminal for a given state but that charging - discharging identification remains, the two discharging phases 3 and 4 follow the two charging phases 1 and 2 in the power cycle.

Assuming steady state conditions exist, the power cycle starts with two SCR's which are on opposite sides $C_o$ but both leading to the same terminal pair e.g. say No. I, (it depends on which of the eight possible states is operating which terminal pair) being made conductive through a shared control pulse arriving from the logic control circuitry. The capacitor $C_o$ is then charged with almost double the amount of voltage difference that existed across the two SCR's before they were rendered conductive. This is because of the inductance which exists somewhere in series (any series position will work in principle). Energy is stored in the inductance and this reaches a peak value when the current flow becomes a max. when the voltage across terminal pair I is equal to that across $C_o$. The SCR switches open when the current falls below the threshold value and $C_o$ will remain charged to that voltage. Phase 1 has now been described. For detail how current actually flows while both charging $C_o$ and delivering current to the load refer to FIG. 15 A, which corresponds to FIG. 14 except that only the conducting SCR's are shown. Table 4 shows numerical voltage values as explanatory example. A voltage of 10 volts at source connected to terminals I supplies power at 20 volts to the load connected to terminals II. Let us assume that the voltage held on $C_o$ was −30 volt prior to switching. A voltage of −20 volt is now applied across the switches as seen by the series combination of $L_o$ and $C_o$. The voltage difference across the switches prior to switching will then be +10 volts. As is by now completely explained a voltage step of about double that value i.e. +20 volts can be added to the value on the capacitor to find the voltage of −10 volts held by the capacitor $C_o$ after switching.

Figure 15A:
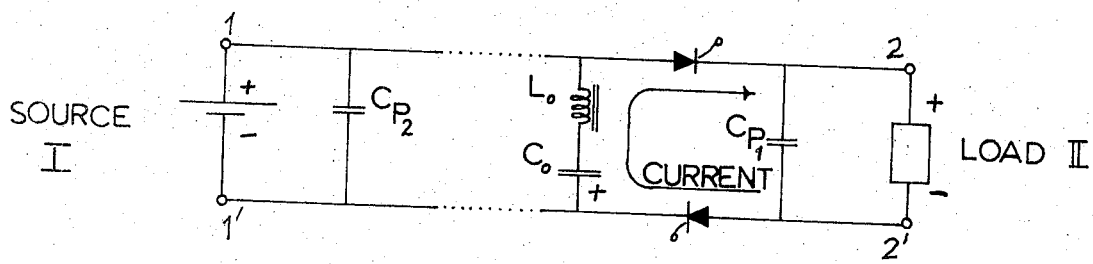
FIG. 15(A) shows charging of Co during phase 1
Figure 15B:
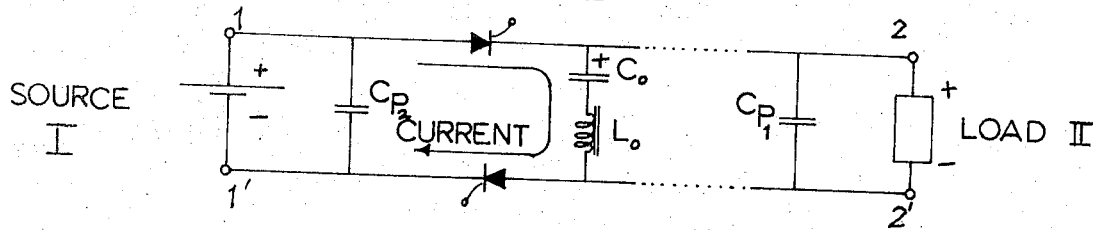
FIG. 15(B) shows charging of Co during phase 2
Figure 15C:
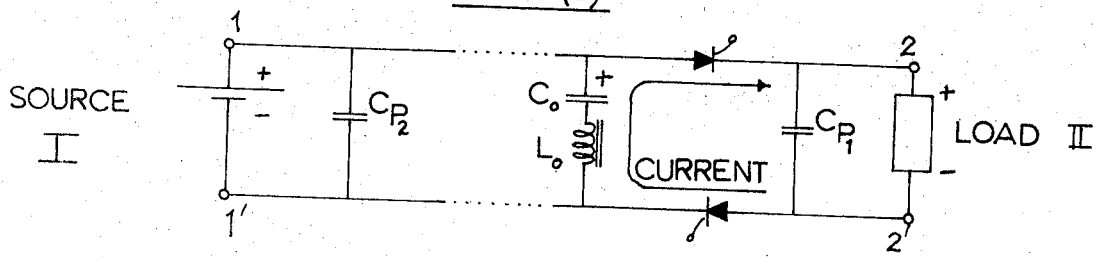
FIG. 15(C) shows discharging of Co during phase 3
Figure 15D:
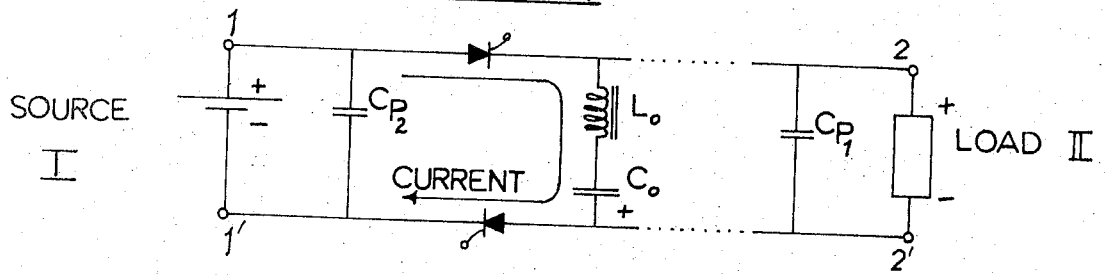
FIG. 15(D) shows discharging of Co during phase 4.

Phase 2 is then initiated by the logic control circuitry by selection of the proper pair of SCR's and the important principles thereof are again explained by FIG. 15(B) and TABLE 4. At the end the capacitor will be fully charged to a value of +30 volts.

Phase 3 and 4 is similarly explained in FIGS. 15 (C) and (D) and table 4 and both are discharging phases leading to an end voltage of −30 volts on $C_o$ at the end of the power cycle. −30 volts is the voltage assumed for the beginning so that the assumption is justified and the cycle is repeated continuously during operation.

TABLE 4.

Voltages across $C_o$ before and after the different phases during the power cycle in the explanatory example.

An important point to note at this stage is that for any given input voltage at terminal pair II which forms the source in this case and for any given output voltage at terminal pair I which in this case is connected to the load, power would flow from terminal pair II to terminal pair L, provided polarities have not been reversed for this specific switching sequence. Each terminal pair partakes once in both a charging and a discharging phase each, so that the sum of the charging voltages balances the sum of the discharging voltages exactly during the power cycle for any given voltages.

Furthermore during phase 1 when charging of $C_o$ occurs and during phase 3 when discharging of $C_o$ occurs the series capacitive inductive network is connected to terminal pair I by selecting the proper SCR's to feed the current in the direction in which it would flow through the load. Both are therefore power delivery phases. The same is true for the phases 2 and 4 as current flows from the source so that power is delivered during both phases.

The amount of current transferred to the load can be calculated in the following way.

The mean current $\overline{I_{output}} = \Delta q/\Delta T_p$ (amp)

$\Delta q$ the total charge in coulomb arriving in the period of the power cycle $\Delta T_p$.

$\Delta q$ is dependent on $C_o$ $\Delta q = 2C \Delta V$

There are however two power delivery phases where $\Delta V$ is the step increase of $C_o$ during the power delivery phases 1 and 3.

$\Delta V \approx 2V$ source and $\overline{I_{output}} 4C_o V$ source/$\Delta T_p$ $\Delta T_p$ is the power cycle period in seconds.

The power delivered to the load then is

P load = $4C_o$ $V$ source $V$ load./$I_p$ (volt x amps)

This is twice the power which the balanced nonisolated four phase species can deliver for the same capacitor value, and the same power cycle frequency.

As with the other species different operating states are possible. These depend on the polarity conditions of the source and the load and the power transfer direction required. A full complement of eight required states means that 16 SCR's are needed.

In table II A these eight states are defined and in table III the truth table of the SCR pair switching sequences for each STATE is given.

| $C_o$ connected to terminal pair No. | $C_o$ being charged or discharged | Phase No. | Voltage held on $C_o$ before switching | Voltage applied by terminal pair as seen by $L_o$ and $C_o$ | Voltage difference across switches prior to switching | | Voltage held by $C_o$ after switching |
|---|---|---|---|---|---|---|---|
| I | charge | 1 | −30 | −20 | +10 | +20 | −10 |
| II | charge | 2 | −10 | +10 | +20 | +40 | +30 |
| I | discharge | 3 | +30 | +20 | −10 | −20 | +10 |
| II | discharge | 4 | +10 | −10 | −20 | −40 | −30 | increase in voltage is twice voltage difference to be added to voltage held on $C_o$ prior to switching.

Table III

The STATES are designated according to the truth table given in Table II (A).
(phases are sequential in numerical order.)
SCR's refer to FIG. 14.

| STATE designation. | phase No. | | | |
|---|---|---|---|---|
| | 1 | 2 | 3 | 4 |
| 1 | $SCR_{15}, SCR_{16}$ | $SCR_1, SCR_2$ | $SCR_3, SCR_4$ | $SCR_9, SCR_{10}$ |
| 2 | $SCR_{13}, SCR_{14}$ | $SCR_7, SCR_8$ | $SCR_5, SCR_6$ | $SCR_{11}, SCR_{12}$ |
| 3 | $SCR_7, SCR_8$ | $SCR_1, SCR_2$ | $SCR_{11}, SCR_{12}$ | $SCR_9, SCR_{10}$ |
| 4 | $SCR_{13}, SCR_{14}$ | $SCR_{15}, SCR_{16}$ | $SCR_5, SCR_6$ | $SCR_3, SCR_4$ |
| 5 | $SCR_7, SCR_8$ | $SCR_{13}, SCR_{14}$ | $SCR_{11}, SCR_{12}$ | $SCR_5, SCR_6$ |
| 6 | $SCR_1, SCR_2$ | $SCR_{15}, SCR_{16}$ | $SCR_9, SCR_{10}$ | $SCR_3, SCR_4$ |
| 7 | $SCR_{15}, SCR_{16}$ | $SCR_{13}, SCR_{14}$ | $SCR_3, SCR_4$ | $SCR_5, SCR_6$ |
| 8 | $SCR_1, SCR_2$ | $SCR_7, SCR_8$ | $SCR_9, SCR_{10}$ | $SCR_{11}, SCR_{12}$ |

| Designated State Number | Polarity of $V_1$ | Polarity of $V_2$ | Direction of Desired Power Flow |
|---|---|---|---|
| 1 | + | + | $V_1 \rightarrow V_2$ |
| 2 | + | + | $V_1 \leftarrow V_2$ |
| 3 | + | − | $V_1 \rightarrow V_2$ |
| 4 | + | − | $V_1 \leftarrow V_2$ |
| 5 | − | − | $V_1 \rightarrow V_2$ |
| 6 | − | − | $V_1 \leftarrow V_2$ |
| 7 | − | + | $V_1 \rightarrow V_2$ |
| 8 | − | + | $V_1 \leftarrow V_2$ |

This Table can be generalized by once again substituting BDR's for SCR's. Also the nomenclature can be changed to a generalized form in which a first suffix indicates the number of the pair, a second suffix indicates the first or second element of the pair, and a third suffix (+) indicates the conducting state for current flow into the positive side of the capacitor and (−) indicates the reverse direction of the conducting state.

Order of Switching Bidirectional Switching Elements

| | 1st | | 2nd | | 3rd | | 4th | |
|---|---|---|---|---|---|---|---|---|
| 1 | $BDR_{41+}$ | $BDR_{42+}$ | $BDR_{11+}$ | $BDR_{12+}$ | $BDR_{31-}$ | $BDR_{32-}$ | $BDR_{22-}$ | $BDR_{21-}$ |
| 2 | $BDR_{22+}$ | $BDR_{21+}$ | $BDR_{31+}$ | $BDR_{32+}$ | $BDR_{11-}$ | $BDR_{12-}$ | $BDR_{41-}$ | $BDR_{42-}$ |
| 3 | $BDR_{31+}$ | $BDR_{32+}$ | $BDR_{11+}$ | $BDR_{12+}$ | $BDR_{41-}$ | $BDR_{42-}$ | $BDR_{22-}$ | $BDR_{21-}$ |
| 4 | $BDR_{22+}$ | $BDR_{21+}$ | $BDR_{41+}$ | $BDR_{42+}$ | $BDR_{11-}$ | $BDR_{12-}$ | $BDR_{31-}$ | $BDR_{32-}$ |
| 5 | $BDR_{31+}$ | $BDR_{32+}$ | $BDR_{22+}$ | $BDR_{21+}$ | $BDR_{41-}$ | $BDR_{42-}$ | $BDR_{11-}$ | $BDR_{12-}$ |
| 6 | $BDR_{11+}$ | $BDR_{12+}$ | $BDR_{41+}$ | $BDR_{42+}$ | $BDR_{22-}$ | $BDR_{21-}$ | $BDR_{31-}$ | $BDR_{32-}$ |
| 7 | $BDR_{41+}$ | $BDR_{42+}$ | $BDR_{22+}$ | $BDR_{21+}$ | $BDR_{31-}$ | $BDR_{32-}$ | $BDR_{11-}$ | $BDR_{12-}$ |
| 8 | $BDR_{11+}$ | $BDR_{12+}$ | $BDR_{31+}$ | $BDR_{32+}$ | $BDR_{22-}$ | $BDR_{21-}$ | $BDR_{41-}$ | $BDR_{42-}$ |

Again it will be possible to use triacs instead of thryristors.

The controlling logic circuitry will be very much the same as for the other species, the main difference being the truth table according to which the logic must work.

Figure 17:
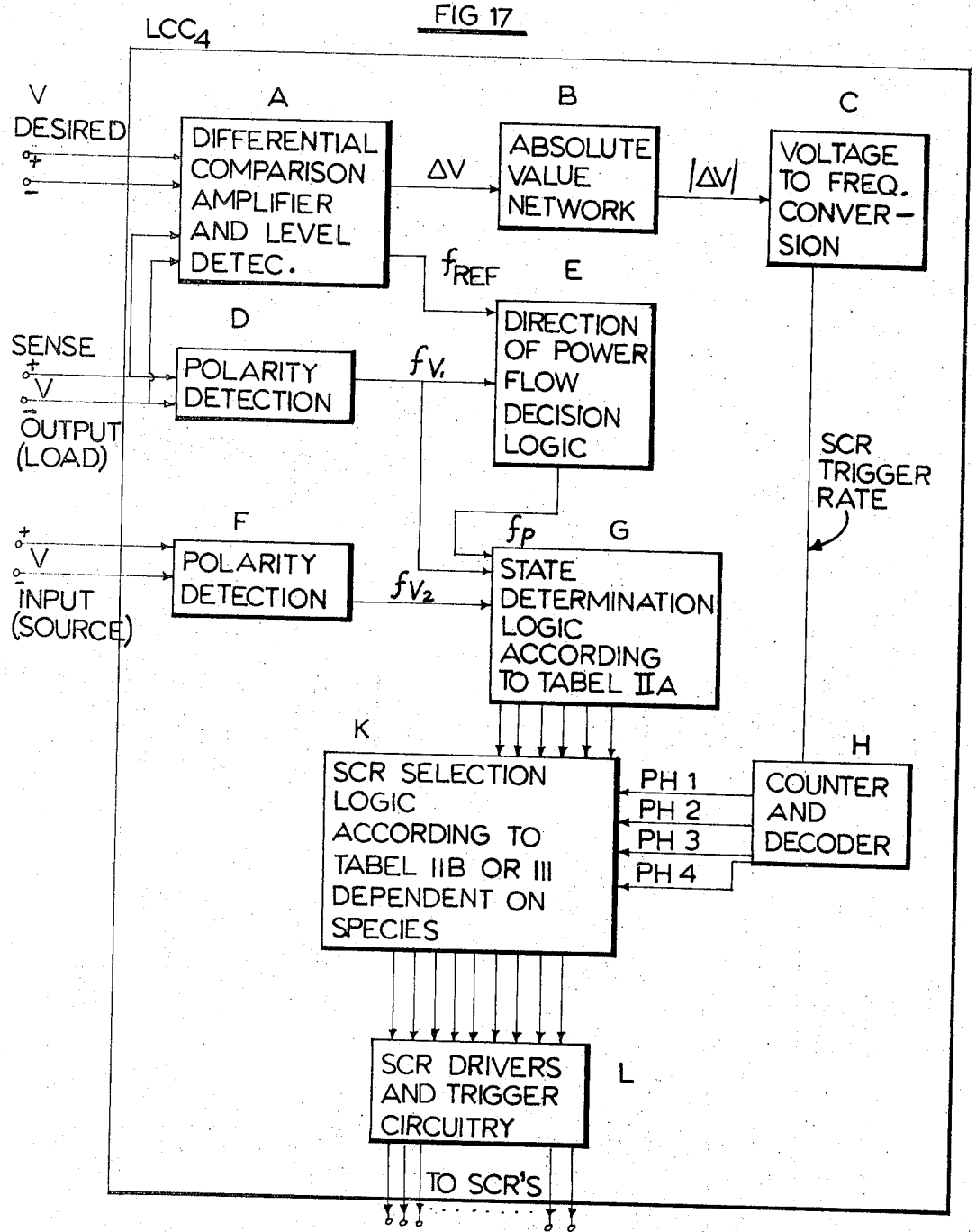
FIG. 17 is schematic diagram of logic circuits applicable to control of the circuit shown in FIG. 14, being the full four phase apparatus, and also the FIG. 10 circuit.

FIG. 17 shows a logic configuration proposed to control a four phase species. In this case we make the control requirement that the output voltage follows a given reference voltage. The converter may then be described as a powerful very low frequency amplifier of high efficiency. The desired output voltage and the true output voltage is compared in A which is a differential amplifier, which gives both a proportional analogue output $\Delta V$ and a logic out $f_{ref} = 1$ when the desired output is more positive than the true output.

$\Delta V$ is fed to an absolute value network B and then $/\Delta V/$ is fed to the voltage to frequency converter C.

This governs the SCR trigger rate so that eventually the current is proportional to the absolute value of the voltage difference between the true and desired output voltages. The voltage to frequency converter feeds into a counter H which has a divide-by-4 capability with decoding so as to supply the four initiating signals for the four phases to K, the SCR selection logic.

The output voltage is also sent to a polarity detection circuit D which generates the logic function $f_{V_2}$ which together with $f_{ref}$ is fed into E which is an exclusive or gate and forms the decision making logic as to the desired power flow direction: $f_p = f_{ref} \oplus f_{V_2}$.

The input voltage is also fed to a polarity detector F, the output of which $f_{V_1}$ is fed together with $f_{V_2}$ and $f_p$ to G to determine the proper STATE, which was defined for both four phase species in table II A. The output of both the STATE generator G and the phase signal generator H are fed to K which may be a matrix for the selection of the SCR to trigger. For the balanced-non-isolated species it is done according to table II B and in the isolated case to table III.

The outputs are coupled to the SCR drivers which might have opto-electronic coupling with the SCR's.

Thus to summarise included in this patent is a generic apparatus. Within the apparatus genus are three apparatus species, namely firstly the three phase species (viz. FIGS. 1, 3, 5, 7 and 9), secondly the four phase non isolated balanced input/output species (viz. FIGS. 10, 11, 12 and 16) and thirdly the four phase isolated input/output species (viz. FIGS. 14, 15 and 17).

What I claim is:
1. An apparatus for converting electrical energy, comprising:
a capacitive element in circuit with a series-connected inductive element,
a series-connected controlled first switching element leading to a first terminal,
a series-connected second switching element leading to a second terminal,
and a series-connected third switching element leading to a third terminal forming a pair with a previously mentioned terminal,
in which at least one switching element additional to the first switching element is also controlled,
in which the capacitive element is given a nominal positive reference side and all three mentioned switching elements are in electrical connection with the positive reference side,
and in which at least one of the switching elements can be conductive to enable current to flow into the positive reference side and at least one of the switching elements can be conductive to enable current to flow out of the positive reference side of the capacitive element,
and logic control circuits adapted to control switching of the switching of the switching elements consecutively and non-repetatively within each cycle of a plurality of repeated power cycles so that each switching element conducts only once in each power cycle, the logic circuits comprising at least state determining logic receiving signals of input voltage polarity, of output voltage polarity and of direction of required power flow; phase determin- ing logic; a variable frequency oscillator controlling switching frequency so as to be proportional to the current delivered; and switching element drivers incorporating switching element selection logic.

2. An apparatus for converting electrical energy, comprising:
a first pair of terminals,
a second pair of terminals,
a base conductor which electrically connects a second terminal of the first terminal pair with a second terminal of the second terminal pair,
a capacitive element in series connection with at least one inductive element, said capacitive element having a nominal positive reference side and a nominal negative reference side and in which the negative side of the capacitor is in connection with the base conductor,
a first bi-directional switching element providing electrical connection between the base conductor and the positive side of the capacitor,
a second bi-directional switching element providing electrical connection between a first terminal of the first terminal pair and the positive side of the capacitor,
and a third bi-directional switching element providing electrical connection between a first terminal of the second terminal pair and the positive side of the capacitor,
and logic control circuits which comprise polarity and relative magnitude sensing logic elements receiving inputs from the first and second terminal pair, desired direction of power flow logic elements, desired current magnitude logic elements and state determining and trigger sequence determining logic elements receiving inputs from all the aforementioned logic elements and giving triggering outputs to the switching elements of the apparatus so as to control their switching to conducting condition from nonconducting condition in the switching sequence set forth in Generalized Table I of the specification in reference to which a voltage across the first pair of terminals is designated $V_1$, a voltage across the second pair of terminals iss designated $V_2$, the first, second and third bidirectional switching elements are designated by $BDR_1$, $BDR_2$ and $BDR_3$ respectively, with the additional subscript "+" designating a conducting state: in the case of $BDR_1$ from base conductor to capacitor and "−" the reverse, in the case of $BDR_2$ from the first terminal of the first terminal pair to the capacitor and "−" the reverse, and in the case of $BDR_3$ from the first terminal of the second terminal pair to the capacitor and "−" the reverse.

3. An apparatus for converting electrical energy, comprising:
a capacitor in circuit with at least one series connected inductive element,
a first terminal pair,
a second terminal pair,
said capacitor having a nominal positive reference side in series connection with:
a first switching element leading to a second terminal of the second terminal pair, the switching element adapted so that current can flow through it into the positive terminal of the capacitor, and into the second terminal of the second terminal pair,
a second switching element leading to a first terminal of the first terminal pair, the switching element adapted so that current can flow through it into the positive terminal of the capacitor and into the first terminal of the first terminal pair,
a third switching element leading to a first terminal of the second terminal pair, the switching element adapted so that current can flow through out of the positive terminal of the capacitor and out of the first terminal of the second terminal pair,
and a fourth switching element leading to a second terminal of the first terminal pair, the switching element adapted so that current can flow through it out of the positive terminal of the capacitor, and out of the second terminal of the first terminal part, in which the nominal negative terminal of the capacitor is decoupled to both the pairs of terminals and logic control circuitry state determining logic receiving signals of input voltage polarity, of output voltage polarity and of direction of required power flow: phase determining logic; a variable frequency oscillator controlling switching frequency so as to be proportional to the current delivered; and switching element drivers incorporating switching element selection logic adapted to control switching of the switching elements in at least one of the two states set out in the table below:

| First terminal pair polarity | second terminal pair polarity | Power flow direction | Switching element switching sequence in each power cycle |
|---|---|---|---|
| + | + first terminal pair | → second terminal pair | 1, 2, 3 4 |
| − | − first terminal pair | ← second terminal pair | 2, 1, 4, 3 | where 1 means the first switching element
where 2 means the second switching element
where 3 means the third switching element
where 4 means the fourth switching element 4. An apparatus for converting electrical energy, comprising:
a first terminal pair,
a second terminal pair,
a floating earth line which is AC decoupled to both the pairs of terminals
a capacitor in series electrical connection with at least one inductive element, in which the capacitor has nominal positive and negative reference sides with the negative side in electrical connection with the floating earth line,
a first bidirectional switching element providing electrical connection between a first terminal of the first terminal pair and the positive side of the capacitor,
a second bidirectional switching element providing electrical connection between a second terminal of the first terminal pair and the positive side of the capacitor,
a third bi-directional switching element providing electrical connection between a first terminal of the second terminal pair and the positive side of the capacitor,
a fourth bi-directional switching element providing electrical connection between a second terminal of the second terminal pair and the positive side of the capacitor and logic control circuits which comprise a differential comparison amplifier and level detector logic element receiving analogues from a desired voltage and an actual circuit output voltage, two polarity detection logic elements receiving analogues of the circuit input and output voltage polarities, an absolute value network receiving a logic input from the differential comparison amplifier and level detector logic element and leading to a voltage to frequency conversion element which in turn leads to a counter and decoder element, a direction of power flow decision logic element receiving logic input from the differential comparison amplifier and level detector element and from the circuit output polarity detection element, leading to a state determination logic element which also receives logic input from the two polarity detection elements, a switching member selection logic element receiving logic input from the state determination logic element and from the counter and decoder element and initiating control pulses to the controlled switching elements adapted to cause them to switch in at least one state as set out in Generalized table II of the specification in reference to which a voltage across the first terminal pair is designated by $V_1$, a voltage across the second terminal pair is designated by $V_2$, the first, second, third and fourth bidirectional switching elements are designated by $BDR_1$, $BDR_2$, $BDR_3$ and $BDR_4$ respectively, with the additional subscript "+" indicating a conducting state in the case of $BDR_1$ from the first terminal of the first terminal pair to the capacitor, in the case of $BDR_2$ from the second terminal of the first terminal pair to the capacitor, in the case of $BDR_3$ from the first terminal of the second terminal pair to the capacitor and in the case of $BDR_4$ from the second terminal of the second terminal pair to the capacitor and the subscript "−", indicating the opposite direction conducting state in each case.

5. An apparatus for converting electrical energy, comprising:

a capacitive element in circuit with at least one series connected inductive element in which the capacitive element has nominal positive and negative reference sides, a first pair of terminals, a second pair of terminals, a first pair of switching elements, the first switching element of the first switching element pair being connected between the second terminal of the second terminal pair and the positive side of the capacitor and the second switching element of the first switching element pair being connected between the second terminal of the second terminal pair and the negative side of the capacitor, the switching elements of the first switching element pair being adapted so that current can flow through them into the positive side of the capacitor, and out of the first terminal of the second terminal pair and into the second terminal of the second terminal pair, a second pair of switching elements, a first switching element of the second switching element pair being connected between the first terminal of the first terminal pair and the positive side of the capacitor, a second switching element of the second switching element pair being connected between the second terminal of the first terminal pair and the negative side of the capacitor, the switching elements of the second switching element pair being adapted so that current can flow through them into the positive side of the capacitor, and into the first terminal of the first terminal pair and out of the second terminal of the first terminal pair, a third pair of switching elements, a first switching element of the third switching element pair being connected between the first terminal of the second terminal pair and the positive side of the capacitor and a second switching element of the third switching element pair being connected between a second terminal of the second terminal pair and the negative side of the capacitor, the switching elements of the third switching element pair being adapted so that current can flow through them into the negative side of the capacitor and into the second terminal of the second terminal pair and out of the first terminal of the second terminal pair, and a fourth switching element pair, a first switching element of the fourth switching element pair being connected between the first terminal of the first terminal pair and the negative side of the capacitor and a second switching element of the fourth switching element pair being connected between the second terminal of the first terminal pair and the positive side of the capacitor, the switching elements of the fourth switching element pair being adapted so that current can flow through them into the negative side of the capacitor and into the first terminal of the first terminal pair and out of the second terminal of the first terminal pair, and logic control circuitry comprising at least state determining logic receiving signals of input voltage polarity, of output voltage polarity and of direction of required power flow; phase determining logic; a variable frequency oscillator controlling switching frequency so as to be proportional to the current delivered; and switching element drivers incorporating switching elements so as to conduct in at least one of the two states set out in the table below:

| First terminal pair polarity | second terminal pair polarity | Power flow direction | Switching element pairs switching sequence in each power cycle |
|---|---|---|---|
| + | + first terminal pair | → second terminal pair | 1,2,3,4 |
| − | − first terminal pair | ← second terminal pair | 2,1,4,3 |

Where 1 means the first switching element pair
2 means the second switching element pair
3 means the third switching element pair
4 means the fourth switching element pair and to continue in cyclic repetition of these sequences.

6. An apparatus for converting electrical energy comprising:

a capacitive element in series connection with at least one inductive element, the capacitive element having nominal positive and negative reference sides, a first paid of terminals, a second pair of terminals, a first pair of bidirectional switching elements, the first switching element of the first switching element pair providing electrical connection between the positive reference side of the capacitor and a first terminal of the first terminal pair and the second switching element of the first switching element pair providing electrical connection between the negative reference side of the capacitor and a second switching element of the first switching element pair, a second pair of bi-directional switching elements, the first switching element of the second switching element pair providing electrical connection between the positive reference side of the capacitor and the second terminal of the first terminal pair and the second stiwching element of the second switching element pair providing electrical connection between the negative reference side of the capacitive element and the first terminal of the second terminal pair, a third pair of bi-directional switching elements, the first bi-directionsl switching elements of the third bi-directional switching element pair providing electrical connection between the positive reference side of the capacitive element and the first terminal of the second terminal pair and the second bi-directional switching element of the third bi-directional switching element pair providing electrical connection between the negative side of the capacitive element and a second terminal of the second terminal pair a fourth pair of bi-directional switching elements, the first bi-directional switching elements of the fourth bi-directional switching element pair providing electrical connection between the positive reference side of the capacitive elements and the second terminal of the second terminal pair and the second bi-directional switching elements of the fourth bi-directional switching element pair providing electrical connection between the negative reference side of the capacitive element and the first terminal of the second terminal pair and logic control circuits which comprise a differential comparison amplifier and a level detector logic element receiving analogues from a desired voltage and an actual circuit output voltage, two polarity detection logic elements receiving analogues of the circuit input and output voltage polarities, an absolute value network receiving a logic input from the differential comparison amplifier and level detector logic element and leading to a voltage to frequency conversion element which in turn leads to a counter and decoder element, a direction of power flow decision logic element receiving logic element receiving logic input from the differential comparison amplifier and level detector element and from the circuit output polarity detection element, leading to a state determination logic element which also receives logic input from the two polarity detection elements, a switching member selection logic element receiving logic input from the state determination logic element and from the counter and decoder element and initiating control pulses to the controlled switching elements adapted to cause them to switch in at least one state set out in Generalized table III as found in the specification, in reference to which a voltage at the second terminal pair is designated by $V_1$, a voltage at the second terminal pair is designated by $V_2$, the bidirectional switching switching elements being indicated by BDR with a first suffix indicating the number of the pair, a second suffix indicating whether it is the first or second of the pair and a third suffix + indicating a conducting state for current flow in a direction into the positive side of the capacitor and out of the negative side of the capacitor and − the reverse direction conducting state.

* * * * *